(12) United States Patent
Zhdanov et al.

(10) Patent No.: US 9,542,359 B2
(45) Date of Patent: Jan. 10, 2017

(54) METHOD OF SUBSURFACE IMAGING USING SUPERPOSITION OF SENSOR SENSITIVITIES FROM GEOPHYSICAL DATA ACQUISITION SYSTEMS

(71) Applicant: TechnoImaging, LLC, Salt Lake City, UT (US)

(72) Inventors: Michael S. Zhdanov, Holladay, UT (US); Leif H. Cox, Butte, MT (US)

(73) Assignee: TechnoImaging, LLC, Salt Lake City, UT (US)

( * ) Notice: Subject to any disclaimer, the term of this patent is extended or adjusted under 35 U.S.C. 154(b) by 801 days.

(21) Appl. No.: 13/730,548

(22) Filed: Dec. 28, 2012

(65) Prior Publication Data

US 2013/0173163 A1    Jul. 4, 2013

Related U.S. Application Data

(60) Provisional application No. 61/581,242, filed on Dec. 29, 2011.

(51) Int. Cl.
*G01V 3/00* (2006.01)
*G01V 3/38* (2006.01)
*G06F 17/16* (2006.01)
*G01V 11/00* (2006.01)

(52) U.S. Cl.
CPC ............ *G06F 17/16* (2013.01); *G01V 11/00* (2013.01); *G01V 11/002* (2013.01)

(58) Field of Classification Search
CPC ........ G01V 11/00; G01V 11/002; G06F 17/16
USPC ....................................................... 702/2, 5
See application file for complete search history.

(56) References Cited

U.S. PATENT DOCUMENTS

| 2006/0036367 A1* | 2/2006 | Brewster | G01V 1/28 702/14 |
| 2010/0206557 A1* | 8/2010 | Davies | G01V 7/00 166/250.01 |

OTHER PUBLICATIONS

McGillivray, Peter Robert., Forward Modeling and Inversion of DC REsistivity and MMR Data., The University of British Columbia Jan. 1992.*

(Continued)

*Primary Examiner* — Gregory J Toatley
*Assistant Examiner* — Yoshihisa Ishizuka
(74) *Attorney, Agent, or Firm* — Workman Nydegger

(57) ABSTRACT

Volume imaging of geological structures and/or man-made objects having physical property using geophysical field sources and/or sensors mounted from at least one data acquisition system. The sources may include natural field sources and/or man-made sources. The sensors may measure at least one component of the geophysical field. The subsets of the geophysical survey formed by the at least one source of geophysical data are selected, and the integrated sensitivity subdomains for selected subsets of the survey are determined by determining the volumes where the integrated sensitivity of the subset is greater than a predetermined threshold. The total sensitivity is determined as the superposition of the sensitivities from all of the integrated sensitivity subdomains. The fields measured for each combination of source and/or sensors may be volume imaged where 3D inversion/imaging is based on the total sensitivity calculated as the superposition of the sensitivities from all of the integrated sensitivity subdomains.

19 Claims, 16 Drawing Sheets

(56) References Cited

OTHER PUBLICATIONS

Dorn, O,. Sensitvity analysis of a nonlinear inversion method for 3D electromagnetic imaging in anisotropic media., Institute of Physics Publishing. Inverse Problems 18 (2002) 285-317., Jan. 2002.*

* cited by examiner

METHOD OF SUBSURFACE IMAGING USING SUPERPOSITION OF SENSOR SENSITIVITIES FROM GEOPHYSICAL DATA ACQUISITION SYSTEMS

CROSS-REFERENCE TO RELATED APPLICATIONS/PUBLICATIONS

This application claims the benefit of and priority to U.S. Provisional Application No. 61/581,242, filed Dec. 29, 2011, which is incorporated herein by reference in its entirety.

This application hereby incorporates the following publication by references in their entirety: Zhdanov, M. S., 2002, Geophysical inverse theory and regularization problems: Elsevier, Amsterdam. Zhdanov, M. S., 2009, Geophysical electromagnetic theory and methods: Elsevier, Amsterdam.

BACKGROUND OF THE INVENTION

1. The Field of the Invention

The present disclosure relates in general to 3D subsurface imaging of different; physical properties of geological formations and/or man-made objects using geophysical data acquisition systems with multiple sources and/or sensors.

2. The Related Technology

Geophysical surveys are widely used in mineral, hydrocarbon, geothermal and groundwater exploration, in-situ mining, hydrocarbon, geothermal and groundwater resource monitoring, unexploded ordinance (UXO), improvised explosive device (IED), tunnel, and underground facility (UGF) detection, geosteering, bathymetry mapping, ice thickness mapping, and environmental monitoring.

To provide economical reconnaissance of subsurface geological formations and/or man-made objects, geophysical data acquisition systems with multiple sources and/or sensors are often deployed from fixed arrays and/or moving platforms such as vessels, wireline devices, bottom hole assemblies (BHA), vehicles, airplanes, helicopters, airships, and unattended aerial vehicles (UAV).

Land geophysical surveys from at least one data acquisition system include various configurations of EM systems such as natural source EM systems (e.g., raagnetotellurics, audiomagnetotellurics) and/or controlled source electromagnetic (CSEM) systems (e.g., induced polarization, spectral induced polarization, controlled source magnetotellurics, controlled source audiomagnetotellurics, time-domain sounding), and/or various configurations of gravity and/or gravity gradiometry systems, and/or various configurations of magnetic and/or magnetic gradiometry systems.

Marine geophysical surveys from at least one vessel include various configurations of EM systems such as towed streamer EM systems, controlled source electromagnetic (CSEM) systems, and marine magnetotelluric (MMT) systems, and/or various configurations of towed streamer reflection seismic systems such as narrow azimuth (NAZ) systems, wide azimuth (WAZ) systems, and extra wide azimuth (XWATS) systems, and/or various configurations of gravity and/or gravity gradiometry systems, and/or various configurations of magnetic and/or magnetic gradiometry systems.

Borehole geophysical surveys from at least one borehole include various configurations of EM systems such as cross-borehole EM systems, and/or various wireline deployed induction logging and/or tensor induction logging devices for formation evaluation, and/or various bottom hole assembly (BHA) deployed induction logging and/or tensor induction logging devices for logging-while-drilling (LWD), measurement-while-drilling (MWD), and/or imaging-while-drilling (IWD), and/or various wireline gravimeter and/or gravity gradiometer systems, and/or various wireline magnetometer and/or magnetic gradiometer systems.

Airborne geophysical surveys from at least one aircraft include various configurations of EM systems such as natural source EM systems (e.g., AFMAG, ZTEM, AirMt, airborne magnetotellurics) and/or controlled source electromagnetic (CSEM) systems (e.g., DIGHEM, RESOLVE, GEOTEM, MEGATEM, SPECTREM, TEMPEST, VTEM, AEROTEM), and/or various configurations of gravity and/or gravity gradiometry systems (e.g., FALCON, Air-FTG), and/or various configurations of magnetic and/or magnetic gradiometry systems.

Geophysical surveys may acquire large volumes of data covering very large areas. For example, airborne geophysical surveys from fixed wing aircraft typically acquire 500 line km of data each day, and airborne geophysical surveys from helicopters typically acquire 200 line km of data each day. Airborne geophysical surveys typically contain multiple survey lines that aggregate as hundreds to thousands of line kilometers of multiple channels of geophysical (e.g., gravity, magnetic, EM) data measured every few meters and cover an area hundreds to thousands of square kilometers in size.

Subsurface imaging is a discipline inclusive of geophysical imaging, migration and/or inversion that reconstructs a physical property volume image of subsurface geological formations and/or man-made objects. The state of the art in methods of subsurface imaging has been discussed by Zhdanov, 2002, and Zhdanov, 2009.

As an example, the state-of-the-art in airborne EM interpretation is based on various 1D methods such as conductivity depth images (CDIs), conductivity depth transforms (CDTs) layered earth inversions, laterally constrained layered earth inversions, and spatially constrained layered earth inversions. These methods cannot reliably or accurately capture the geological complexity of the 3D subsurface conductivity.

As another example, the state-of-the-art in gravity and magnetic interpretation is based on various 3D inversion methods. The survey area is discretized as a 3D earth model where each cell of the model is characterized by a uniform physical property such as density and/or magnetic susceptibility and/or magnetization. The gravity and/or magnetic fields and/or their sensitivities are predicted from the entire 3D earth model. This requires considerable computer memory and processing resources. Large gravity and/or magnetic surveys are reduced to subsets (also called "tiles") which are independently inverted using software such as GRAV3D and/or MAG3D from the University of British Columbia Geophysical Inversion Facility. After each subset (or tile) has been inverted, their resultant 3D physical property models are stitched together. This workflow is often inadequate for very large gravity and/or magnetic surveys.

As data acquisition systems continue to evolve for geophysical surveys that will continue to increase in the volume of geophysical data being acquired, and interpreters demand accurate and higher resolution 3D volume imaging of the subsurface from said geophysical data, there exists an urgent need for robust methods to produce 3D volume images from geophysical data.

Subsurface imaging using geophysical methods has applications beyond resource exploration and production. The development and use of high-resolution airborne and satellite surveillance has prompted the widespread proliferation of covert tunnels and underground facilities (UGFs). UGFs are used to produce and harbor both weapons and illegal drugs, and in the case of tunnels, move contraband and people without detection across international borders. There exists an urgent need for 3D volume imaging of geophysical data for tunnel and UGF detection and monitoring.

Geophysical methods have been developed for detecting unexploded ordinance (UXO) that contains metal and/or electronic parts. While UXO detection is relatively mature discipline for weapons test site remediation, improvised explosive devices (IEDs) made primarily from fertilizer and lacking metal or electronic parts represent a persistent direct threat to civilian and military personnel in combat zones. IEDs are far more difficult to detect than standard UXO. There exists an urgent need to develop 3D volume imaging of geophysical, data measured from UAVs and vehicles for IED detection and discrimination.

BRIEF SUMMARY

The embodiments disclosed herein are related to systems, methods, and computer readable medium for volume imaging of physical properties of an examined medium from geophysical field data measured from geophysical surveys deployed as fixed arrays or using a moving platform based on the superposition of sensitivities from all the integrated sensitivity subdomains determined for the corresponding subsets of the entire geophysical survey. In the systems, methods, and computer readable medium at least one source and/or the receiver of a geophysical field is placed in at least one position on at least one data acquisition system deployed as a fixed array(s) or from a moving platform. At least one component of geophysical field data is measured with at least one sensor in at least one receiving position along at least one survey line by the at least one data acquisition system. The subsets of the geophysical survey formed by the at least one source and/or receiver of geophysical data are selected. The integrated sensitivity subdomains for selected subsets of the geophysical survey are selected by calculating the volumes where the integrated sensitivity of the subset is greater than a given threshold. The sensitivity (Fréchet derivatives) of geophysical data collected by a subset of the geophysical survey from the corresponding integrated sensitivity subdomains is calculated. The total sensitivity (Fréchet matrix) for the entire geophysical survey as the superposition of the sensitivities (Fréchet derivatives) from all of the integrated sensitivity subdomains is selected. A 3D volume image of the corresponding physical property is constructed by applying an inversion/migration imaging method to the geophysical data measured by the at least one data acquisition system, using the total sensitivity (Fréchet matrix) calculated as the superposition of the sensitivities (Fréchet derivatives) from all of the integrated sensitivity subdomains.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 illustrates an embodiment of a system for volume imaging of geological formations and/or man-made objects including sources and/or sensors of the geophysical field attached to a vessel moving at some elevation along a survey line L(t) above the surface of the examined medium.

DETAILED DESCRIPTION

Figure 1:
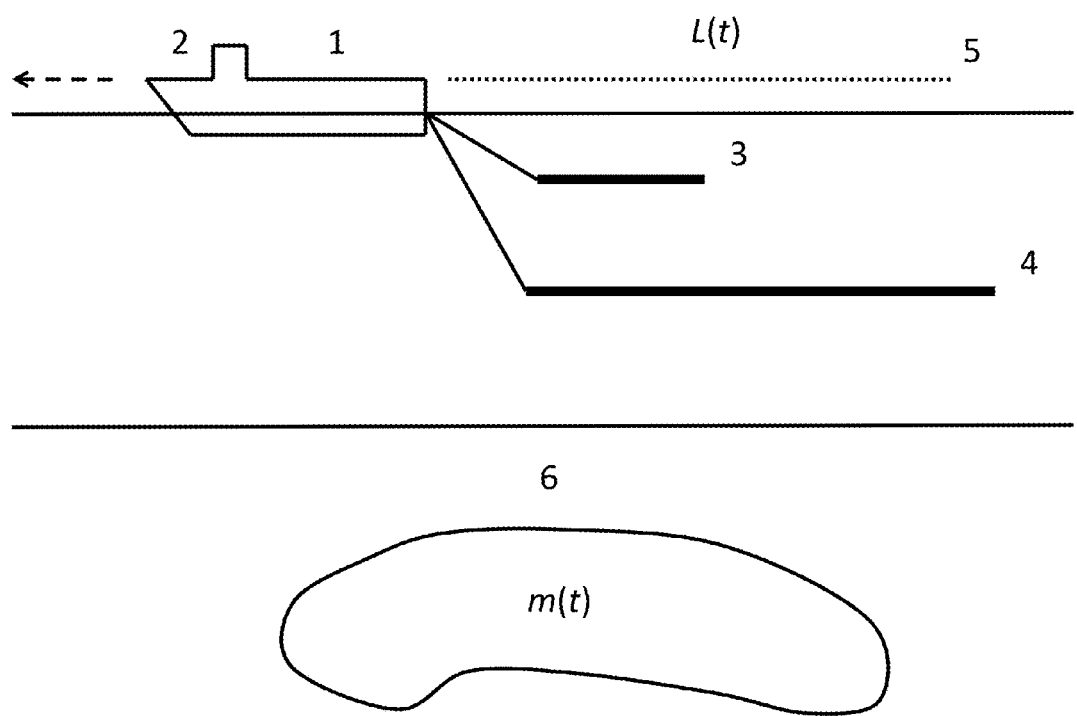
FIG. 1 illustrates an embodiment of a system for volume imaging of geological formations and/or man-made objects including the source and/or the receivers and/or sensors of the geophysical field attached to a vessel moving at some elevation along a survey line L(t) above the surface of the examined medium.

Exemplary embodiments of the invention will become more fully apparent from the following detailed description and appended claims, taken in conjunction with the accompanying drawings. It is understood that this discussion describes only exemplary embodiments and are, therefore, not to be considered limiting of the invention's scope.

Geophysical surveys may encompass marine, borehole, ground and airborne geophysical field measurements from data acquisition systems with multiple sources and/or sensors deployed from fixed arrays or moving platforms such as but not limited to vessels, wireline devices, bottom hole assemblies (BHAs), vehicles, airplanes, helicopters, airships, and unattended aerial vehicles (UAV).

Geophysical surveys may encompass measuring one or more components of a geophysical field, where the geophysical data can be processed and/or analyzed in either the time domain and/or the frequency domain and/or the spatial domain and/or the wave number domain.

An EM system may encompass any system for measuring at least one natural EM source and/or man-made inductive source and/or man-made galvanic source, at least one inductive and/or galvanic and/or capacitive sensor, and a processor where EM data may be stored and/or transferred and/or recorded and/or processed either in real time or after completion of the EM survey. The EM system may be mounted on at least one transportable data acquisition system equipped with a recording unit(s) for measuring spatial location information of the fixed array and/or at least one moving platform and/or EM sources and/or EM sensors.

Geophysical surveys may encompass measuring one or more components of the gravity and/or magnetic vectors and/or tensors with at least one sensor, where the gravity and/or magnetic vector and/or tensor are due to geological formations and/or man-made objects, where the gravity and/or magnetic vector and/or tensor data can be processed and/or analyzed in either the spatial domain and/or the wave number domain.

A gravity and/or magnetic vector and/or tensor system may encompass any system for measuring at least one component of the gravity and/or magnetic vector and/or tensor, and a processor where gravity and/or magnetic vector and/or tensor data may be stored and/or transferred and/or recorded and/or processed either in real time or after completion of the geophysical survey. The gravity and/or magnetic vector and/or tensor system may be mounted on at least one data acquisition system equipped with a recording unit(s) for measuring spatial location information of the fixed array and/or at least one moving platform and/or gravity and/or magnetic vector and/or tensor sensors.

Geophysical surveys may encompass measuring one or more components of the seismic wave field with at least one seismometer, where the seismic data are due to the propagation and/or scattering of seismic compressional and/or shear waves in the earth due to natural seismic sources and/or man-made seismic sources, where the seismic data can be processed and/or analyzed in either the time domain and/or the frequency domain and/or the spatial domain and/or the wave number domain.

A seismic system may encompass any system for measuring at least one natural, seismic source and/or man-made seismic source and/or at least one component of the seismic compressional and/or shear waves, and a processor where seismic data may be stored and/or transferred and/or recorded and/or processed either in real time or after completion of the seismic survey. The seismic system may be mounted on at least one data acquisition system equipped with a recording unit(s) for measuring spatial location information of the fixed array and/or at least one moving platform and/or seismometers.

The particular combination of at least one source and/or sensor in a geophysical survey has sensitivity to a limited volume of the subsurface that is dependent upon the at least one source and/or sensor geometry and/or configuration, survey design, spectral content of the measured data, data processing, and/or physical properties of the subsurface.

It was demonstrated by Zhdanov, 2002, that the volume of subsurface, where a combination of at least one source and/or sensor in a geophysical survey has a measurable sensitivity, can be determined from the integrated sensitivity of the at least one source and/or sensor combination, which allows the interpreter to evaluate a cumulative response of the observed data due to the physical properties of the subsurface.

In at least one embodiment of a method disclosed herein, the sensitivity of a subset of geophysical survey can be described by the finite spatial subdomain of the subsurface that contains the majority (e.g., >90%) of the integrated sensitivity of a combination of sources and receivers (subset) of the particular subset of the survey. The theoretically predicted geophysical data and their sensitivities (Fréchet derivatives) can be calculated from this integrated sensitivity subdomain for the particular subset of geophysical survey without any appreciable loss of accuracy. This integrated sensitivity subdomain for a particular subset geophysical survey is dependent on the source and/or receiver locations, geometries and components, spectral content of the data, and subsurface physical properties, and is usually much smaller than the volume of the entire earth model used to describe the actual subsurface. The sensitivity of geophysical field data (Fréchet derivatives) for the entire geophysical survey and entire earth model can be constructed as the superposition of the sensitivities (Fréchet derivatives) from all of the integrated sensitivity subdomains determined for the corresponding subsets of the geophysical survey. The Fréchet matrix for the entire earth model is calculated and stored as a sparse matrix, rather than a full matrix as per the state-of-the-art described by Zhdanov, 2002, and Zhdanov, 2009. The field data and sparse Fréchet matrix for the entire earth model can be used for volume imaging the subsurface physical properties within the entire earth model, such as the conductivity, density, susceptibility, magnetization, compressional wave velocity or shear wave velocity.

In at least one embodiment of a method disclosed herein, the subsurface geological formations and/or man-made objects may be volume imaged by 3D inversion of the measured field data as a 3D physical property model. In at least one other embodiment of a method disclosed herein, the subsurface geological structures and/or man-made objects may be volume imaged by an approximate 3D inversion of the measured field data into a 3D physical property model. In yet at least one other embodiment of a method disclosed herein, the subsurface geological structures and/or man-made objects may be volume imaged by 3D migration (holographic imaging) of the measured field data into a 3D physical property model.

In one embodiment of a method disclosed herein, the field data and Fréchet derivatives of each combination of the source and/or the receivers can be calculated using a numerical solution of geophysical field equations using any combination of analytical, semi-analytical, finite difference, finite volume, finite element, edge element, boundary element, integral equation, and/or hybrid methods.

In at least one embodiment of a method disclosed herein, the field data and Fréchet derivatives of each combination of the source and/or the receivers mounted from data acquisition system deployed as a fixed array and/or at least one moving platform can be calculated and used for real-time volume imaging, from the start of the survey up to the given time moment t.

In at least one embodiment of a method disclosed herein, the geophysical fields are electromagnetic fields.

In at least one embodiment of a method disclosed herein, the geophysical fields are gravity fields.

In at least one embodiment of a method disclosed herein, the geophysical fields are magnetic fields.

In at least one embodiment of a method disclosed herein, the geophysical fields are seismic fields.

At least one embodiment of a method disclosed herein, can be applied for subsurface imaging of geological formations and/or man-made objects for mineral, hydrocarbon, geothermal and groundwater exploration, in-situ mining, hydrocarbon, geothermal and groundwater resource monitoring, unexploded ordinance (UXO), improvised explosive device (IED), tunnel, and underground facility (UGF) detection, geosteering, bathymetry mapping, ice thickness mapping, and environmental monitoring, using field data generated from the source and/or the receivers mounted from at least one moving platform such as but not limited to a vessel, wireline device, bottom hole assemblies (BHA), vehicle, airplane, helicopter, airship or unattended aerial vehicle (UAV).

At least one embodiment of this method can be used in geophysical exploration for mineral, hydrocarbon, geothermal, and groundwater resources.

At least one embodiment of this method can be used in geophysical monitoring for in-situ mining, hydrocarbon, geothermal, and groundwater resources.

At least one embodiment of this method can be used for detecting UXO, IEDs, tunnels, and UGFs.

At least one embodiment of this method can be used for geosteering.

At least one embodiment of this method can be used for formation evaluation and/or LWD and/or MWD and/or IWD.

At least one embodiment of this method can be used for mapping bathymetry in shallow and/or temporal and/or turbid water.

At least one embodiment of this method can be used for mapping ice thickness.

At least one embodiment of this method can be used for environmental monitoring, such as salinity, acid mine drainage, and pollution plumes. In all embodiments of the method disclosed herein, the physical properties of the subsurface may include, but not be limited to conductivity, density, susceptibility, magnetization, compressional wave velocity or shear wave velocity. In all embodiments of the method disclosed herein, the term conductivity is used exclusively even though resistivity is the reciprocal of conductivity and the two terms can be interchanged without any loss of meaning or generality.

Due to physical-chemical polarization processes that accompany current flow in the earth, the conductivities of earth materials such as rocks and/or fluids are a complex, frequency-dependent function. At least one embodiment of a method disclosed herein can be applied to volume imaging of the conductivity and/or dielectric permittivity and/or induced polarization relaxation terms such as but not limited to chargeability and/or time constant and/or frequency constant, of geological structures and/or man-made objects.

One embodiment of a volume imaging system is illustrated in FIG. 1. A volume imaging system 1, located on a vessel 2, may include sources 3 and sensors 4 of the geophysical field attached to the vessel that is moving at some elevation along a survey line L(t) 5 above the surface of an examined medium 6.

Figure 2:
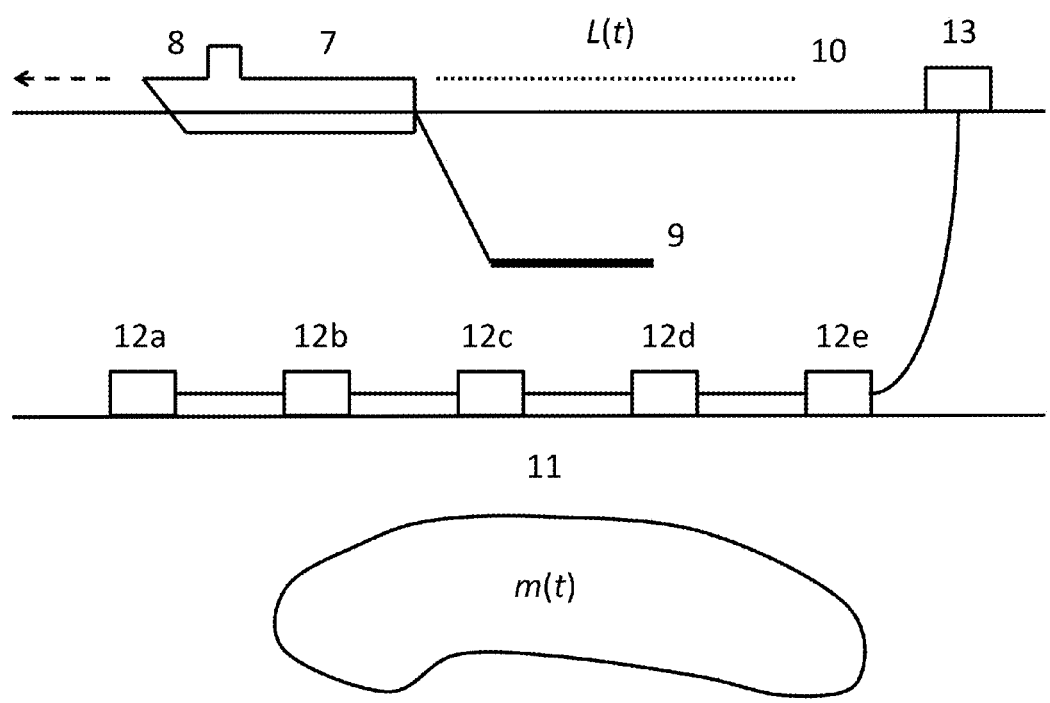
FIG. 2 illustrates an embodiment of a system for volume imaging of geological formations and/or man-made objects including sources of the geophysical field attached to a vessel moving at some elevation along a survey line L(t) above the surface of the examined medium upon which upon which sensors of the geophysical field are cable deployed and the geophysical data are transmitted from a buoy to the volume imaging system.

Another embodiment of a volume imaging system is illustrated in FIG. 2. An imaging system 7, located on a vessel 8, may include sources 9 of the geophysical field attached to the vessel that is moving at some elevation along a survey line L(t) 10 above the surface of the examined medium 11 upon which sensors 12 of the geophysical field are deployed. Geophysical data measured by the sensors 12 may be transmitted in from a buoy 13 that connects the sensors 12 to the volume imaging system 7.

Figure 3:
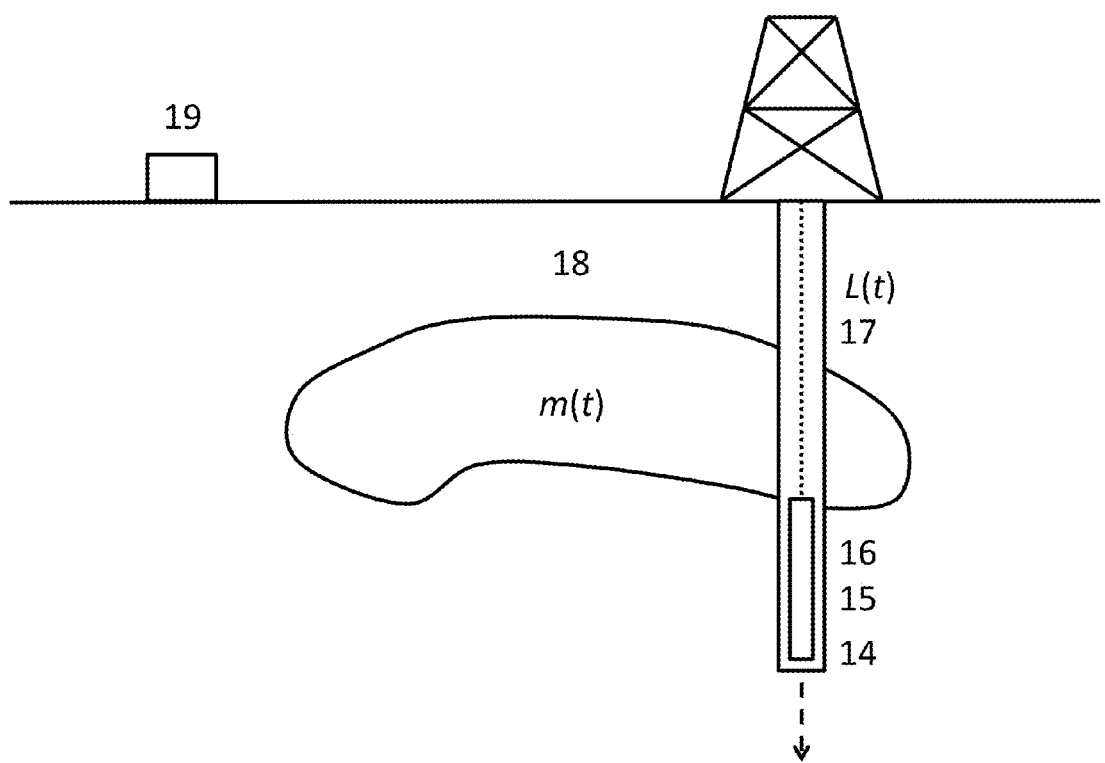
FIG. 3 illustrates an embodiment of a system for volume imaging of geological formations and/or man-made objects including sources and sensors of the geophysical fields attached to a bottom hole assembly (BHA) that is moving along a survey line L(t) through the examined medium.

Another embodiment of a volume imaging system is illustrated in FIG. 3. A real time volume imaging system 14, located in a bottom hole assembly (BHA) for imaging-while-drilling, may include sources 15 and sensors 16 of the geophysical field located in the BHA. The BHA may be moving at a trajectory along a survey line 17 through an examined medium 18. A volume image is transmitted from the volume imaging system 14 to a remotely located graphical user interface (GUI) 19.

Figure 4:
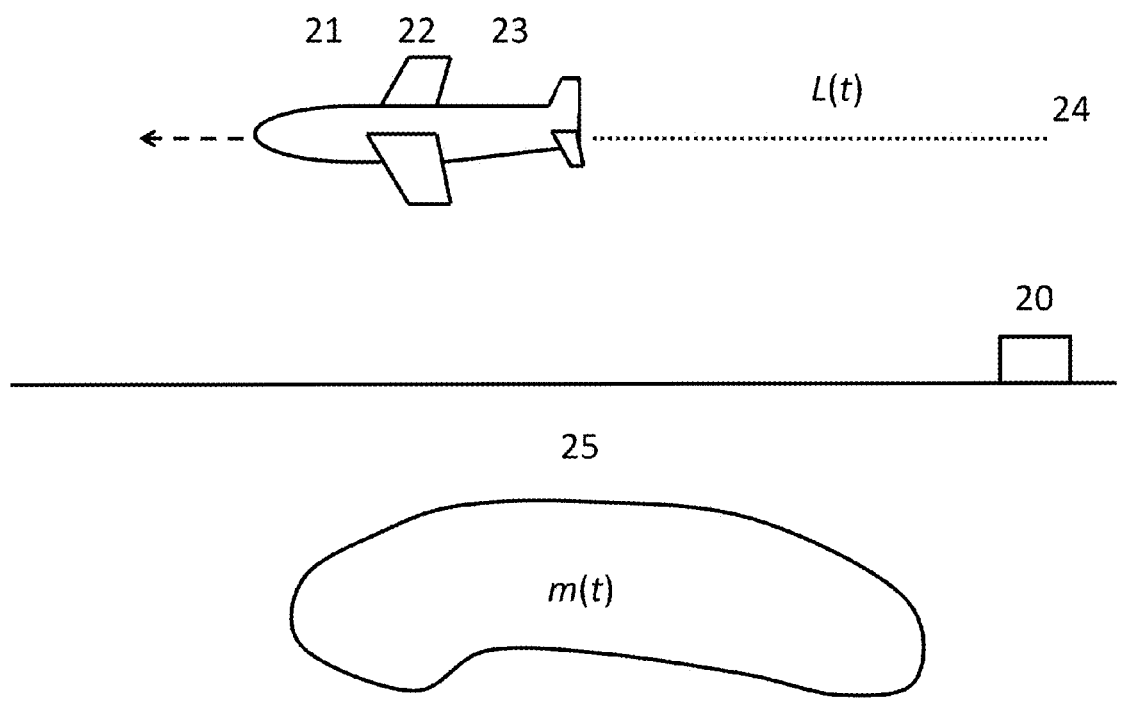
FIG. 4 illustrates an embodiment of a system for volume imaging of geological formations and/or man-made objects including sources and sensors of the geophysical fields mounted on an unattended aerial vehicle (UAV) that is moving along a survey line L(t) above the surface of the examined medium and the geophysical data is transmitted from the UAV to the volume imaging system.

Another embodiment of a volume imaging system is illustrated in FIG. 4. A volume imaging system 20 is remotely located from a moving platform that may be an unattended aerial vehicle (UAV) 21 that may include sources 22 and/or sensors 23 of the geophysical field attached to the UAV. The UAV may move at some elevation along a survey line L(t) 24 above the surface of an examined medium 25 and the geophysical data is transmitted in from the UAV 21 to the volume imaging system 20 (FIG. 4).

Figure 5:
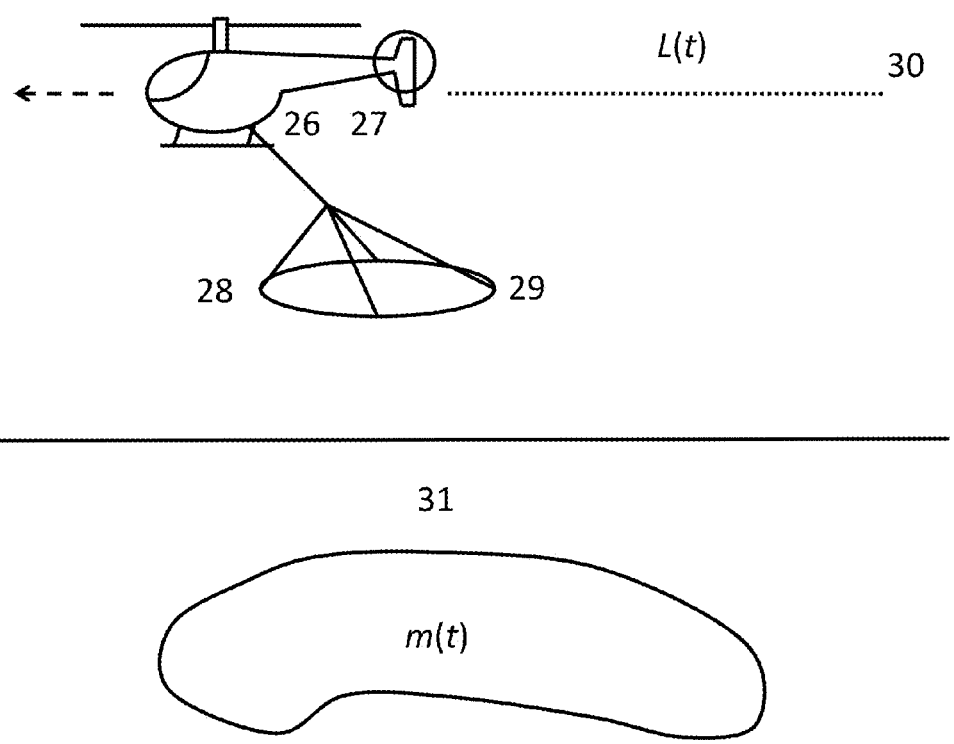
FIG. 5 illustrates an embodiment of a system for volume imaging of geological formations and/or man-made objects including sources and sensors of the geophysical fields attached to a helicopter that is moving along a survey line L(t) above the surface of the examined medium.

Another embodiment of a volume imaging system is illustrated in FIG. 5. A volume imaging system 26, located on a helicopter 27, may include sources 28 and/or sensors 29 of the geophysical field attached to the helicopter that is moving at some elevation along a survey line L(f) 30 above the surface of an examined medium 31.

Figure 6:
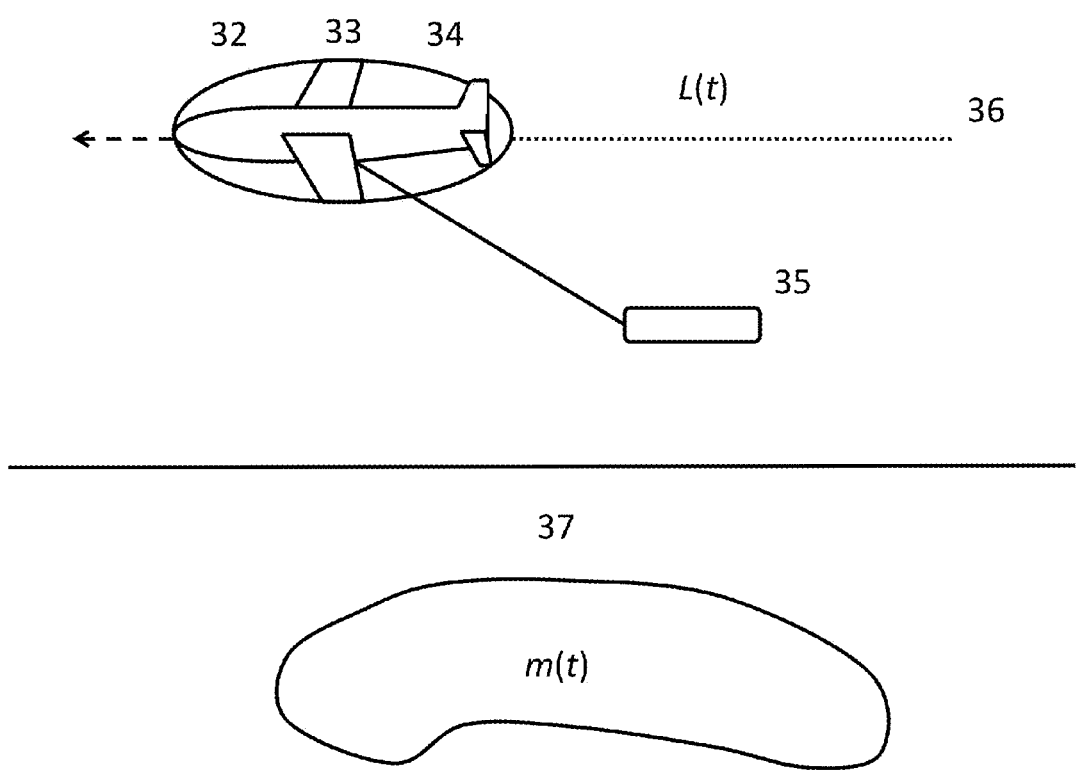
FIG. 6 illustrates an embodiment of a system for volume imaging of geological formations and/or man-made objects including sources and sensors of the geophysical fields attached to a fixed wing aircraft that is moving along a survey line L(t) above the surface of the examined medium.

Yet another embodiment of a volume imaging system is illustrated in FIG. 6. A volume imaging system 32, located on a fixed wing aircraft 33, may include sources 34 and/or sensors 35 of geophysical fields attached to the fixed wing aircraft that is moving along a survey line L(t) 36 at some elevation above the surface of an examined medium 37.

In the embodiment of FIG. 6, the sensors 35 may record the electric and/or magnetic potentials and/or fields and/or their time derivatives generated by subsurface geological formations and/or objects excited by an EM source 34, along the survey line(s) L(t) 36 flown by the fixed wing aircraft. Volume imaging may be applied to the EM data collected along the survey line(s) L(t) 36 flown by the fixed wing aircraft. The volume image will be an electrical conductivity model m(t) of the examined medium 37 located directly under and/or nearby the survey line(s) L(t) 36.

Figure 7:
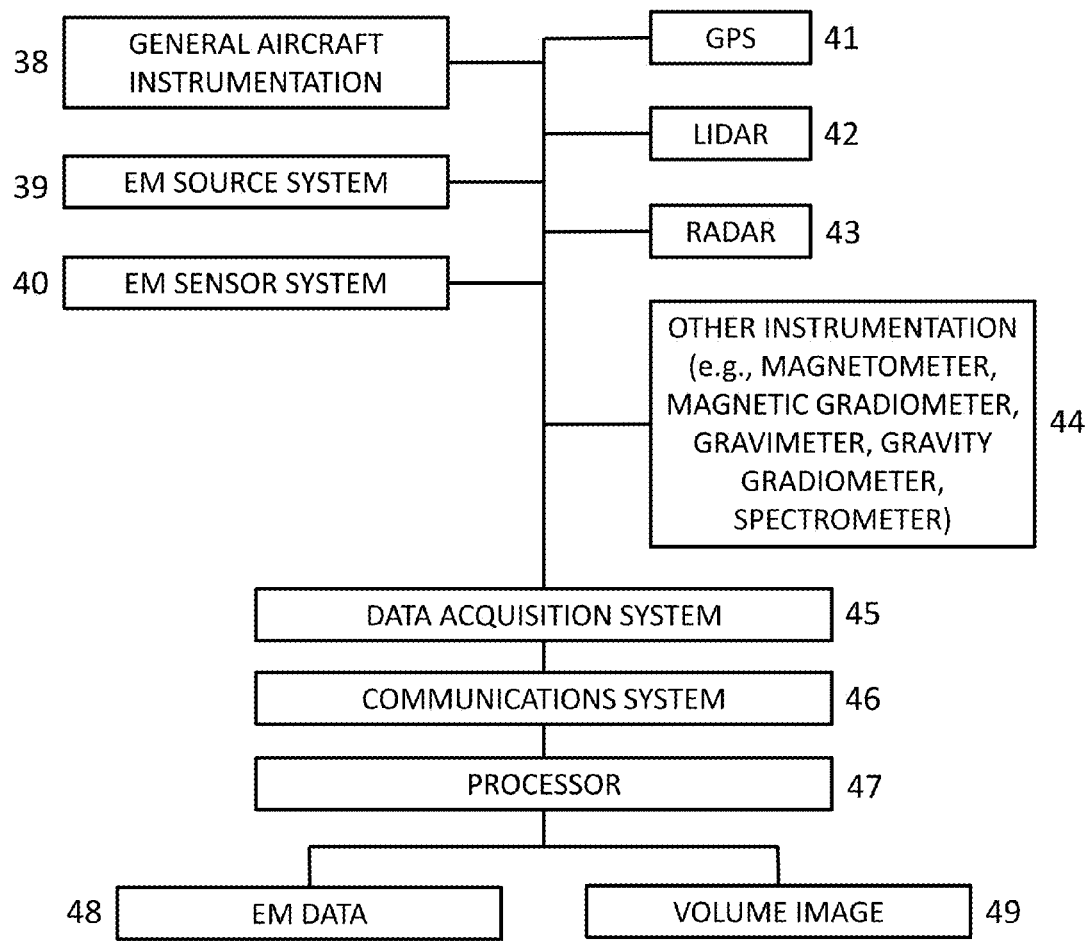
FIG. 7 illustrates an embodiment of a system for volume imaging of EM geophysical data from a fixed wing aircraft.

An embodiment of a system for volume imaging of EM data measured from a fixed wing aircraft is illustrated in FIG. 7, which illustrates an embodiment of a volume imaging system 32. The volume imaging system may include general aircraft instrumentation 38, EM source system 39, EM sensor system 40, global positioning system (GPS) 41, LIDAR altimetry 42, radar altimetry 43, other geophysical sensor systems including but not limited to magnetometers, magnetic gradiometers, gravimeters, gravity gradiometers and gamma ray spectrometers 44, data acquisition system 45, communications system 46, and processor 47, which collectively can produce EM data 48 and volume images 49.

Figure 8:
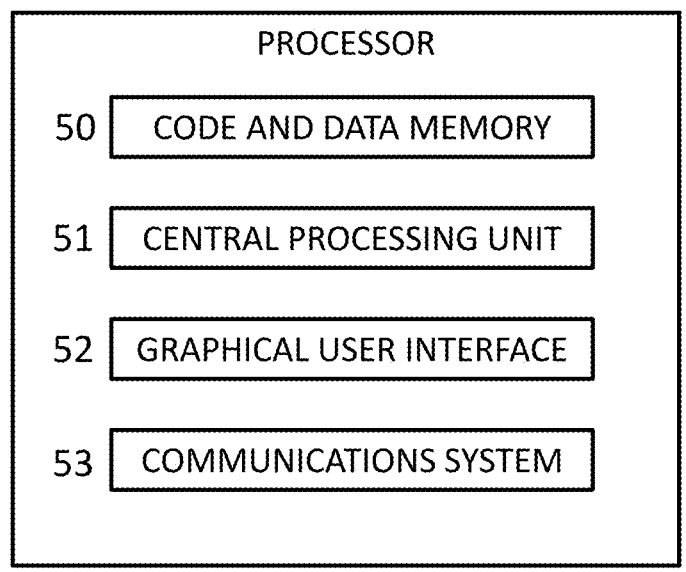
FIG. 8 illustrates an embodiment of a processor for volume imaging of EM geophysical data.

An embodiment of a processor 47 is illustrated in FIG. 8. The processor 47 may include, for example, a data and code memory 50 for storing EM data received from the data acquisition system 45 via the communications system 46, volume imaging computer software and volume images, a central processing unit 51 for executing the volume imaging computer software on the EM data to generate volume images, a graphical user interface (GUI) 52 for displaying the volume images, and a communications system 53 for system interoperability. The processor 47 may comprise of a single processing unit or can be distributed across one or more processing units in one or more locations. The communications system 53 can include I/O interfaces for exchanging information with one or more external devices. The data and code memory 50 may comprise of a single memory device or can be distributed across one or more memory devices in one or more locations connected via the communications system 53. The communications system 53 may transmit volume images to a remotely located GUI 52.

Figure 9:
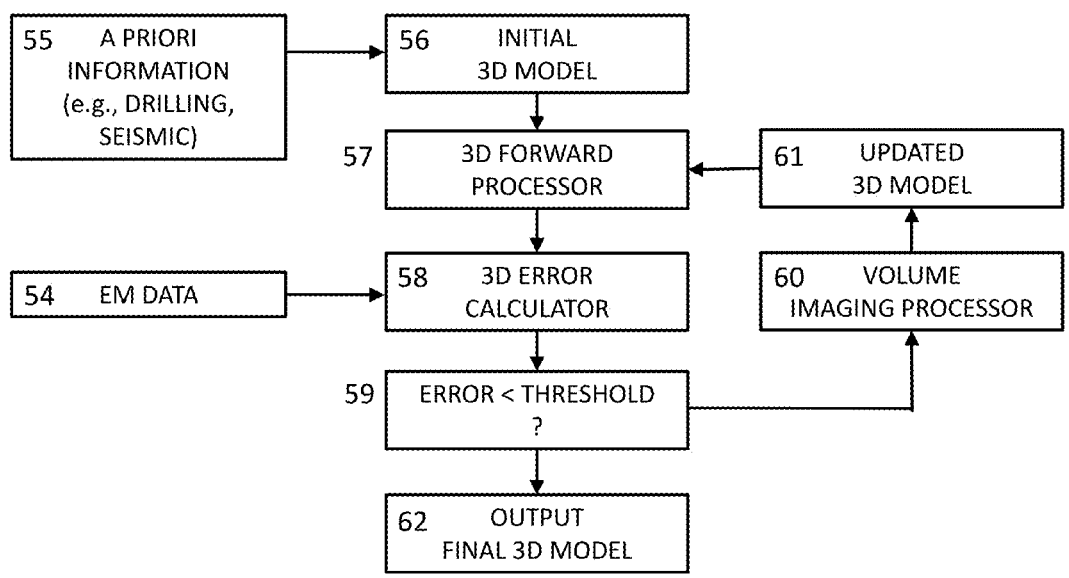
FIG. 9 illustrates an embodiment of a method for volume imaging of EM geophysical data.

An embodiment of a method for volume imaging is schematically shown in FIG. 9. It will be appreciated that the method of FIG. 9 may be practiced in any of the embodiments disclosed in FIGS. 1-8 as well as other embodiments. In the method, EM data 54 may be generated by at least one EM sensor measuring at least one EM source along a survey line(s), and may be recorded by the processor 47. The processor 47 may process the EM data in by methods of digital signal processing techniques including but not limited to de-noising, telluric cancellation, sferic rejection, stacking, filtering, deconvolution, convolution, and primary field stripping. The processor 47 may also merge spatial location information with the EM data. A priori information 55 of geological structures and/or objects may be independently known and/or inferred from other sources prior to the survey such as but not limited to geological mapping, drilling, seismic imaging, magnetic inversion and/or gravity inversion. The a priori information may be used to construct an initial 3D electrical conductivity model 56. A 3D forward processor 57 may compute predicted EM data from the initial 3D conductivity model 56. An error calculator 58 may compute the error (or misfit) between the predicted EM data and observed EM data 54. If the error between the predicted EM data and observed EM data 54 is greater than a threshold 59, a 3D inversion operator 60 may compute an updated 3D conductivity model 61. The 3D forward processor 57 may compute the predicted EM data from the updated 3D conductivity model 61. The aforementioned 3D inversion process is iterated until terminated by at least one operator determined termination condition such as the error decreasing below a preset threshold. Once the 3D inversion process is terminated, a final 3D electrical conductivity model 62 is generated.

In the present embodiment, the initial 3D electrical conductivity model 56 may be constructed in real time from 1D methods including but not limited to conductivity depth images (CDIs), conductivity depth transforms (CDTs) layered earth inversions, laterally constrained layered earth inversions, and spatially constrained layered earth inversions of the EM data.

Figure 10:
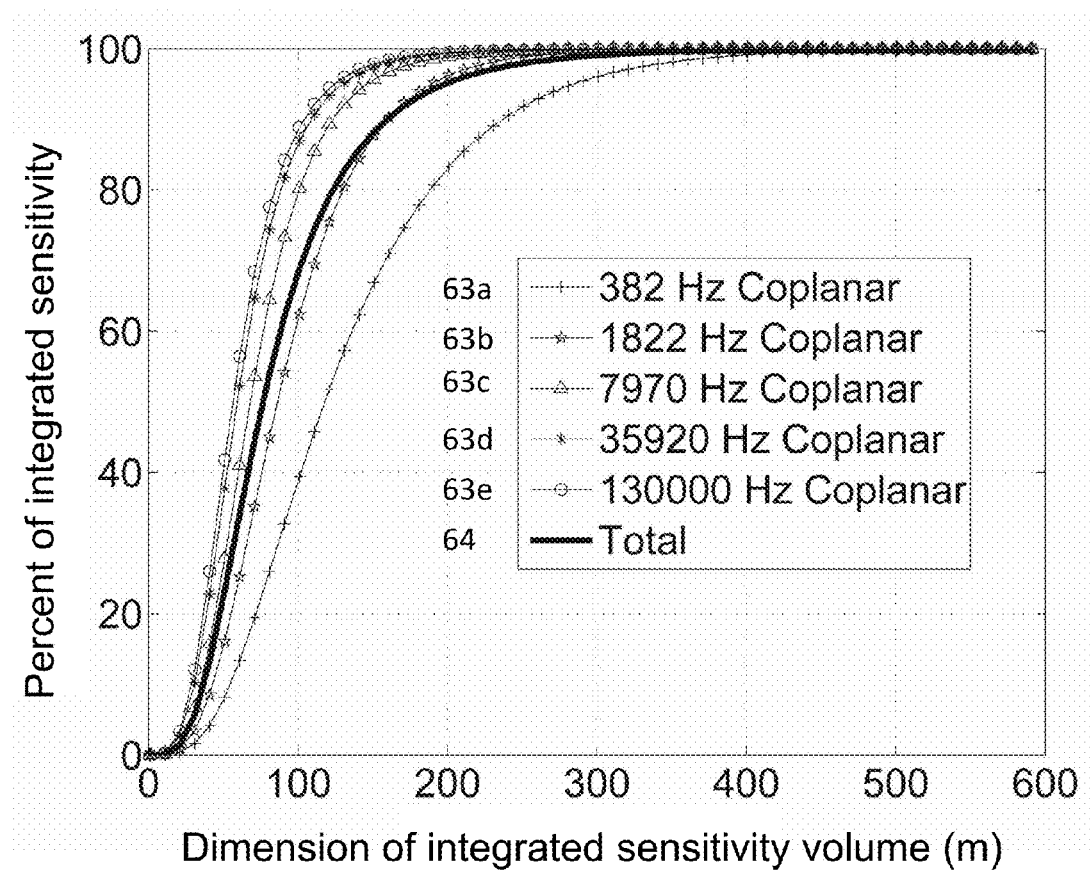
FIG. 10 illustrates an example of a footprint for a frequency-domain helicopter EM system of inductive sources and receivers flown 37 m above a 200 mS/m half-space.

A demonstration of the spatial dimensions of the integrated sensitivity of a particular EM source and EM sensor combination for the present embodiment is shown in FIG. 10. For the purpose of demonstration, a frequency-domain helicopter EM system has been simulated for an inductive source and inductive sensor height of 37 m above a half-space of 200 mS/m. FIG. 10 presents the integrated sensitivity as a function of the integrated sensitivity domain for each individual component and frequency 63 and the integrated sensitivity as a function of footprint size for all components and frequencies 64. The integrated sensitivity for all components and frequencies 64 shows that over 95% of the total EM sensitivity is produced from a 200 m integrated sensitivity domain.

Figure 11:
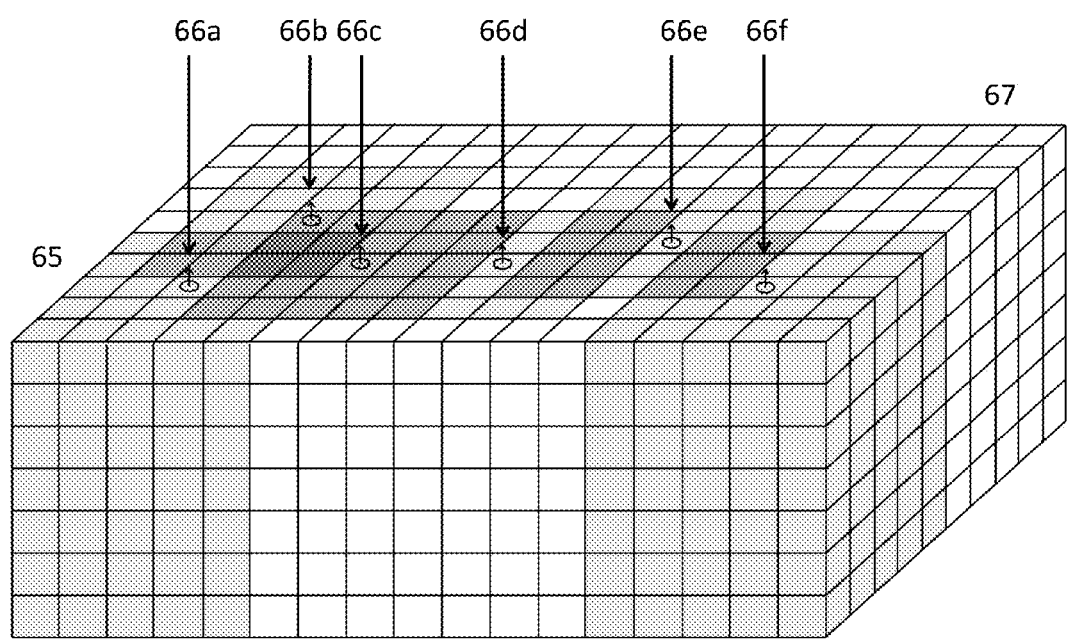
FIG. 11 illustrates an example of the superposition of the cells in the entire) earth model where the cells are shaded by the overlap of integrated sensitivity volumes for different combinations of EM sources and EM sensors.

A demonstration of the superposition of the integrated sensitivity domains 65 for different EM sources and EM sensors 66 over the same earth model 67 for the present embodiment is shown in FIG. 11. For the purpose of illustration, darker shades of gray are used to convey those cells in the earth model 67 have higher folds from different combinations of EM sources and EM sensor. Those cells colored white are not coincident with any integrated sensitivity domain for the EM sources and EM sensors for the given survey.

In the present embodiment, the spatial dimensions of the integrated sensitivity domain may be calculated for each EM source and EM sensor pair, may consist of multiple dimensions where each of the multiple dimensions are specific for a given frequency and/or time and/or component measured by the EM sensor and/or spatial separation of the EM source and EM sensor pair.

In the present embodiment, the 3D forward processor 57 may compute a numerical solution of the geophysical fields using Maxwell's equations in either the frequency-domain or the time-domain including but not limited to analytical, semi-analytical, finite difference, finite element, boundary element, integral equation and/or hybrid numerical methods. The 3D forward processor 57 may include further processing and/or computation of transfer functions so that the predicted EM data is an emulation of the actual EM system response. For each EM source and EM sensor pair, the predicted EM data are computed from a 3D electrical conductivity model that is a subset of either the initial 3D electrical conductivity model 56, the updated 3D electrical conductivity model 61, or the final 3D electrical conductivity model 62 that is of a finite spatial dimension equal to the dimensions of integrated sensitivity domain.

In the present embodiment, the 3D forward processor 57 may compute an approximate solution of Maxwell's equations using linear approximations such as but not limited to the Born approximation, extended Born approximation, quasi-Born approximation, quasi-linear approximation, localized quasi-linear approximation, and quasi-analytical approximations and/or series.

In the present embodiment, the volume imaging processor 60 may use iterative linearized inversion and/or migration and/or line search and/or preconditioning techniques. Fréchet derivatives and/or their actions may be computed either explicitly or implicitly by adjoint operators computed from a numerical solution of Maxwell's equations in either the frequency-domain or the time-domain including but not limited to analytical, semi-analytical, finite difference, finite element, boundary element, integral equation and/or hybrid numerical methods.

In the present embodiment, Fréchet derivatives and/or their actions may be approximated using linear approximations such as but not limited to the Born approximation, extended Born approximation, quasi-Born approximation, quasi-linear approximation, localized quasi-linear approximation, and quasi-analytical approximations and/or series.

In the present embodiment the volume imaging processor 60 may include further processing and/or computation of transfer functions so that the Fréchet derivatives are an emulation of the actual EM system sensitivities. For each EM source and EM sensor pair, the Fréchet derivatives are computed from a 3D electrical conductivity model that is a subset of either the initial 3D electrical conductivity model 56, the updated 3D electrical conductivity model 61, or the final 3D electrical conductivity model 62 that is of a finite spatial dimension equal to the dimensions of integrated sensitivity domain.

In the present embodiment, the volume imaging processor 60 assembles the Fréchet derivatives and/or their actions to generate the updated 3D electrical conductivity model 61 by superposition of the Fréchet derivatives and/or their actions for all EM source and EM sensor pairs computed for the updated 3D conductivity model 62.

Figure 12:
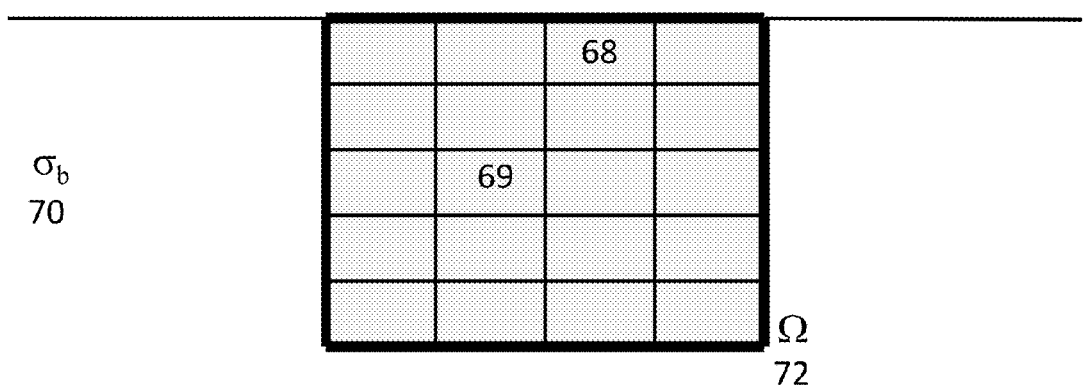
FIG. 12 illustrates an example of the integrated sensitivity domain for a particular combination of EM source and EM sensor simulated using an integral equation or compact finite-element method with perfectly matched boundary conditions on all boundaries of the integrated sensitivity domain.

In one embodiment of the method being described, as illustrated in FIG. 12, the 3D forward processor 57 computes EM data and Fréchet derivatives for the integrated sensitivity domain 68, which is part of a conductivity model consisting of the model grid or mesh 69, background conductivity 70 and air 71. For computing EM data and Fréchet derivatives, the boundary conditions 72 on the model grid or mesh are all perfectly matched to the surrounding media, as per integral equation, compact finite element and similar hybrid methods. In this particular embodiment, the integrated sensitivity domain 68 and the model grid or mesh 69 is identical.

Figure 13:
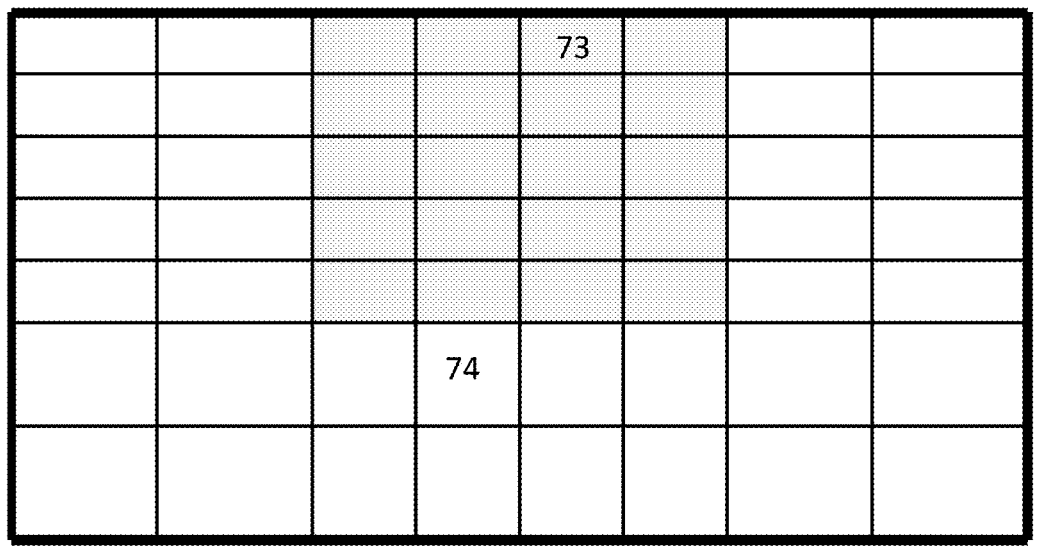
FIG. 13 illustrates an example of the integrated sensitivity domain for a particular combination of EM source and EM sensor simulated using a finite difference, finite volume, finite element, or edge element method with perfectly matched boundary conditions on the air-earth interface, and homogeneous Dirichlet or absorbing boundary conditions on the remaining boundaries of the integrated sensitivity domain.

In another embodiment of the method being described, as illustrated in FIG. 13, the 3D forward processor 57 computes EM data and Fréchet derivatives for the integrated sensitivity domain 73, which is part of a conductivity model consisting of the model grid or mesh 74, and air 75. For computing EM data and Fréchet derivatives, the boundary conditions 76 on the model grid or mesh are perfectly matched on the air-earth interface, and may have homogeneous Dirichlet or absorbing boundary conditions on all other boundaries, as per finite difference, finite volume, and finite element methods. In this particular embodiment, the integrated sensitivity domain 73 is a subset of the model grid or mesh 74 required for the 3D forward processor 57.

Figure 14:
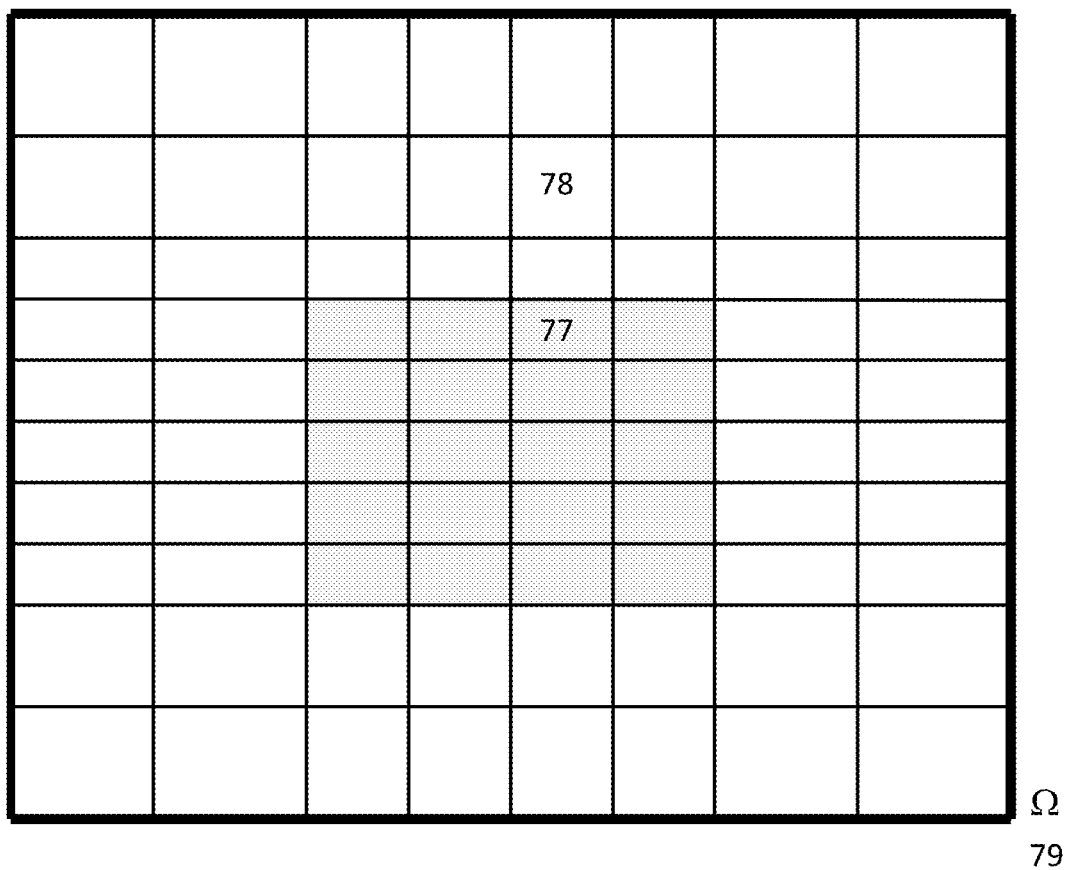
FIG. 14 illustrates an example of the integrated sensitivity domain for a particular combination of EM source and EM sensor simulated using a finite difference, finite volume, finite element, or edge element method with homogeneous Dirichlet or absorbing boundary conditions on all boundaries of the integrated sensitivity domain.

In yet another embodiment of the method being described, as illustrated in FIG. 14, the 3D forward processor 57 computes EM data and Fréchet derivatives for the integrated sensitivity domain 77, which is part of a conductivity model consisting of the model grid or mesh 78 that may or may not contain air. For computing EM data and Fréchet derivatives, the boundary conditions 79 on the model grid or mesh may be homogeneous Dirichlet and/or absorbing boundary conditions on all boundaries, as per finite difference, finite volume, and finite element methods. In this particular embodiment, the integrated sensitivity domain 77 is a subset of the model grid or mesh 78 required for the 3D forward processor 57.

In the present embodiment, the volume imaging processor 60 may generate the updated 3D electrical conductivity model 61 using regularization that may be inclusive smooth and/or focusing stabilizers including but not limited to Laplacian, first derivative, minimum norm, minimum support, minimum vertical support, minimum gradient support, and/or any combination thereof.

Geophysical fields may include but not be limited to electromagnetic, gravity, magnetic, and seismic fields.

Marine geophysical systems may include but not be limited to moving source and fixed sensor systems, moving source and moving sensor systems, and fixed source and moving sensor systems.

Borehole geophysical systems include, but are not limited to, moving sources and/or moving sensors, cross-borehole systems, logging-while-drilling (LWD) systems, measurement-while-drilling (MWD) systems and imaging-while-drilling (IWD) systems.

Land geophysical systems may include but not be limited to moving source and fixed sensor systems, moving source and moving sensor systems, and fixed source and moving sensor systems.

Airborne EM systems may include but not be limited to moving sources and/or moving sensors mounted on at least one unattended aerial vehicle (UAV), fixed-wing aircraft with towed bird sensor systems, fixed-wing aircraft with wing tip sensor systems, fixed-wing aircraft with pod mounted systems, and helicopter systems.

Hybrid geophysical systems may involve any combination of fixed and/or moving sources with fixed and/or moving sensors based on any component of the aforementioned marine geophysical systems, borehole geophysical systems, land, geophysical, systems, and airborne geophysical systems, such as but not limited to electro-seismic and seismo-electric systems.

EXAMPLE 1

The following is an example of at least some of the principles of volume imaging that is offered to assist in the practice of the disclosure. It is not intended to thereby limit the scope of the disclosure to any particular theory of operation or to any field of operation.

A typical airborne EM survey will contain multiple survey lines that aggregate as hundreds to thousands of line kilometers of EM data acquired every few meters and cover an area hundreds to thousands of square kilometers in size.

The following example of an airborne EM system is a frequency-domain EM system for which the inductive source and inductive sensors are mounted in a bird that is attached to a helicopter (FIG. 5).

The earth model is discretized into a grid or mesh of cells of constant physical properties. In the practice of the disclosure, the physical properties may include but not limited to conductivity, magnetic susceptibility, dielectric permittivity and induced polarization parameters, and these may be isotropic or anisotropic. In the following example, the physical property of conductivity is real and isotropic though the generalization to conductivity also being complex and/or anisotropic equally applies. The conductivity $\sigma$ of each cell in the mesh of the 3D earth model may be separated into a background conductivity $\sigma_b$ and anomalous conductivity $\sigma_a$:

$$\sigma(r) = \sigma_b(r) + \sigma_a(r), \tag{1}$$

where r is a radius vector.

The earth model is excited by an EM field generated by the EM source located on the moving platform with an electric current density $I^a$. This field is time harmonic as $e^{-i\omega t}$ and is measured by EM sensors also located on the moving platform.

The total electric (E) and magnetic (H) fields measured by the EM sensors from the start of the survey up to a given time moment t can be represented as the sum of the background electric ($E^b$) and magnetic ($H^b$) fields generated by the EM source in the 3D earth model with background conductivity, and anomalous electric ($E^a$) and magnetic ($H^a$) fields due to scattering from the anomalous conductivity:

$$E(r,t)=E^b(r,t)+E^a(r,t), \quad (2)$$

$$H(r,t)=H^b(r,t)+H^a(r,t). \quad (3)$$

As discussed by Zhdanov, 2009, From Maxwell's equations, a volume integral equation for the anomalous electric fields can be derived:

$$E(r')=E^b(r')+\int_V \hat{G}_E(r',r) \cdot \sigma_a(r)[E^b(r)+E^a(r)]d^3r, \quad (4)$$

where $\hat{G}_E(r',r)$ is the electric Green's tensor for the background conductivity model. The magnetic fields are then computed from the equation:

$$E(r')=E^b(r')+\int_V \hat{G}_H(r',r) \cdot \sigma_a(r)[E^b(r)+E^a(r)]d^3r, \quad (5)$$

where $\hat{G}_H(r',r;t)$ is the magnetic Green's tensor for the background conductivity model.

In state of the art 3D EM modeling, the volume integrals of equations 4 and 5 are evaluated for those cells in the 3D earth model where the total conductivity differs from the background conductivity. A 3D earth model for an airborne EM survey may contain tens of millions of cells, making numerical solutions to equations 4 and 5 intractable.

Referring to FIG. 10, FIG. 10 demonstrates that 95% of the total EM sensitivity is produced from a 200 m integrated sensitivity domain. The area of the integrated sensitivity domain is considerably less than the area of the EM survey. It follows that there is no necessity to compute the volume integrals of equations 4 and 5 for those cells where the total conductivity differs from the background conductivity that are beyond the integrated sensitivity domain for a given EM source and EM sensor pair. FIG. 10 demonstrates that the size of the integrated sensitivity domain may vary with frequency. The size of the integrated sensitivity domain may also vary with the location of the moving platform, and/or the subsurface conductivity.

The volume integrals of equations 4 and 5 can be evaluated for those cells where the total conductivity differs from the background conductivity within the EM system footprint for a given EM source and EM sensor pair. Even though an earth model for an airborne EM survey may contain tens of millions of cells, limiting numerical solutions of equations 4 and 5 with an integrated sensitivity domain for a given EM source and EM sensor pair is tractable.

Using the method of moments, equation 4 can be reduced to the linear system:

$$E=(I-\Gamma \cdot \sigma_a)^{-1} \cdot E^b, \quad (6)$$

where $E^b$ is the vector of basis function coefficients for the background electric field, I is the identity matrix, $\Gamma$ is the matrix of volume integrated electric Green's functions for the background conductivity model, and $\sigma_a$ is a diagonal matrix of anomalous conductivities. Equation 6 solves directly for the total electric field E while retaining the distributed source in terms of the background electric fields $E^b$. This solution has the distinct computational advantage for earth models with high conductivity contrasts or very resistive hosts where the background electric fields $E^b$ and anomalous electric fields $E^a$ are of near-equal amplitude but opposite sign. Given finite machine precision, the addition of the background and anomalous electric fields introduces numerical errors and inaccuracies in the predicted EM data.

The matrix of volume integrated electric Green's functions $\Gamma$ for the background conductivity model may be computed for at least one background conductivity model. In one embodiment of the present invention, the matrix of volume integrated electric Green's functions $\Gamma$ may be identical for each integrated sensitivity domain, meaning they need only be calculated once and then translated over the earth model. In other embodiments of the present invention, the matrix of volume integrated electric Green's functions $\Gamma$ may be pre-computed for a range of background conductivity models.

For real time volume imaging, the volume integrated magnetic Green's functions of equation (5) may be pre-computed and stored prior to the survey so they do not have to be evaluated real time.

For iterative linearized inversion and/or migration with line search and/or preconditioning, the Fréchet derivatives $F_{i,j}$ of each EM data $d_i$ to perturbations in conductivity $\sigma_j$ in each cell of the 3D earth model:

$$F_{i,j} = \frac{\delta d_i}{\delta \sigma_j}, \quad (7)$$

need to calculate either implicitly or explicitly using adjoint operators and/or approximations along the survey lines covered by the moving platform. The computed Fréchet derivatives may be assembled into a Fréchet matrix F that is sparse rather than full as per state-of-the-art.

As an example, the sensitivities may be evaluated using the quasi-Born method:

$$R(r',t)=\int_V \hat{G}_H(r',r) \cdot E(r,t) d^3r. \quad (8)$$

The volume integral of equation 8 can be evaluated for those cells within the integrated sensitivity domain for a given EM source and EM sensor pair. Even though an earth model for an airborne EM survey may contain tens of millions of cells, limiting numerical solutions of equation (8) to an integrated sensitivity domain for a given EM source and EM sensor pair is tractable. The matrix of volume integrated magnetic Green's functions for equation (8) is identical to the matrix of volume integrated magnetic Green's functions for equation (5) which may be pre-computed and stored prior to the survey.

EXAMPLE 2

Figure 15:
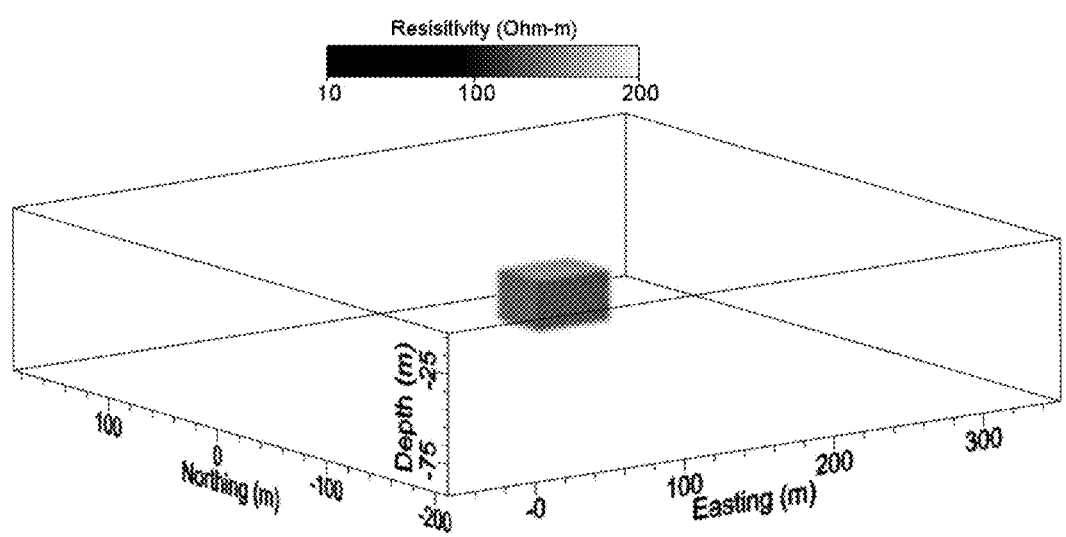
FIG. 15 illustrates an example of volume imaging of an entire EM survey for a frequency-domain helicopter EM system.

FIG. 15 illustrates an example of a synthetic earth model for volume imaging for a frequency-domain helicopter EM system comprising of inductive sources and receivers. The original 3D earth model consists of one body of 50 m cubic dimension and 10 ohm-m resistivity buried 50 m from the surface in an otherwise homogeneous half-space of 100 ohm-m.

In the present example, the 3D forward processor 57 consists of an edge-based finite element method that solves for the inhomogeneous Helmholtz equation for the vector potentials with Lorenz gauge on a model grid or mesh with homogeneous Dirichlet boundary conditions on all boundaries, as exemplified in FIG. 14. Using an integral equation method, the EM data and Fréchet derivatives are calculated from the vector potentials with Lorenz gauge. The volume imaging processor 60 is based on a regularized re-weighted conjugate gradient method with focusing regularization.

Figure 16:
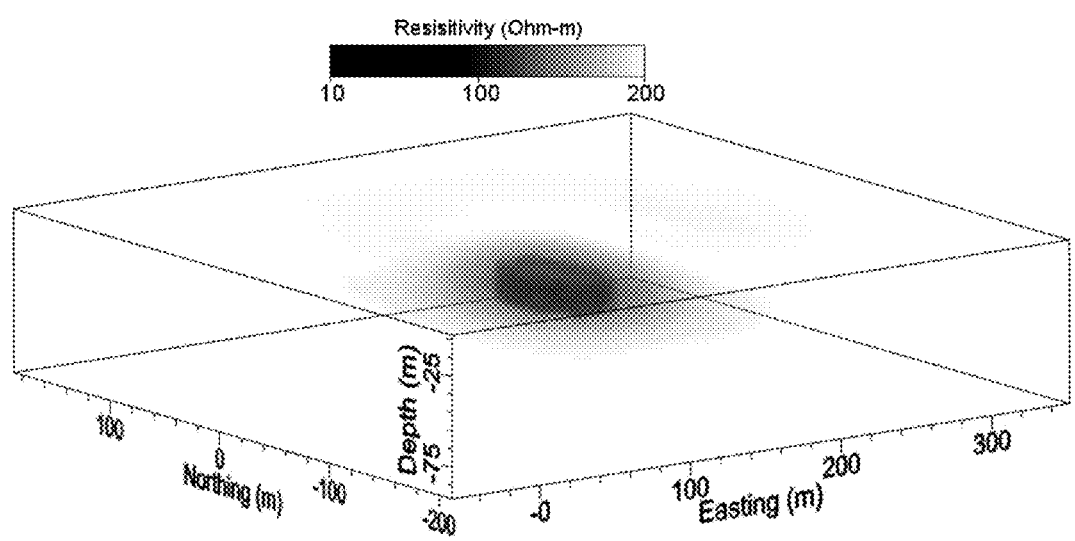
FIG. 16 illustrates an example of the 3D resistivity model recovered from volume imaging of the synthetic EM data for a frequency-domain helicopter EM system comprising of inductive sources and receivers

FIG. 16 illustrates an example of the 3D resistivity model recovered from volume imaging of the synthetic EM data for a frequency-domain helicopter EM system comprising of inductive sources and receivers. A white line traces the outline of the original one body of 50 m cubic dimension and 10 ohm-m resistivity buried 50 m from the surface in an otherwise homogeneous half-space of 100 ohm-m. The original one body is reconstructed effectively.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such, computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for volume imaging of physical properties of an examined medium from geophysical field data measured from geophysical surveys deployed as fixed arrays or using a moving platform based on a superposition of sensitivities from all integrated sensitivity subdomains determined for corresponding subsets of an entire geophysical survey, the method comprising:
   a. placing at least one source of a geophysical field in at least one position on at least one data acquisition system deployed as a fixed array or from a moving platform;
   b. measuring at least one component of geophysical field data with one or more sensors located in one or more receiving positions along one or more survey lines performed by the at least one data acquisition system;
   c. selecting one or more subsets of a geophysical survey comprising the one or more survey lines performed by the data acquisition system, the selected one or more subsets being based on a pairing of the at least one source and the one or more sensors located in the one or more receiving positions;
   d. determining integrated sensitivity subdomains for the pairing of the at least one source and the one or more sensors of the selected one or more subsets of the geophysical survey by calculating one or more volumes where an integrated sensitivity of the selected one or more subsets is greater than a given threshold, wherein those volumes where the integrated sensitivity of the selected one or more subsets is greater than the given threshold are included in the sensitivity subdomains;
e. calculating a sensitivity of geophysical data collected by the selected subsets of the geophysical survey corresponding to the integrated sensitivity subdomains;
f. calculating a total sensitivity for the entire geophysical survey as the superposition of the sensitivities calculated for all of the integrated sensitivity subdomains;
g. constructing a 3D volume image of the corresponding physical property of the examined medium by applying inversion/migration imaging to the geophysical data measured by the at least one data acquisition system using the total sensitivity calculated as the superposition of the sensitivities from all of the integrated sensitivity subdomains; and
h. selecting one or more geographical formations and/or man-made objects for further exploration based on the constructed 3D volume image, the selection specifying which portion of the examined medium that the selected one or more geographical formations and/or man-made are located.

2. The method of claim 1, wherein the physical property comprises one or more of electrical conductivity, dielectric permittivity, induced polarization parameters, density, magnetization, susceptibility, compressional wave velocity, shear wave velocity, acoustic impedance, or any combination representing the physical properties of the examined medium containing geological formations and/or man-made objects.

3. The method of claim 1, wherein the geophysical field is one of an electromagnetic field, a gravity field, a magnetic field, or a seismic or acoustic field.

4. The method of claim 1, wherein the at least one field sensor comprises a plurality of field sensors arranged in an array.

5. The method of claim 1, wherein the one or more sensors include one or more of inductive and/or galvanic and/or capacitive sensors, gravimeters, gravity gradiometers, magnetometers, magnetic gradiometers, and/or seismometers.

6. The method of claim 1, wherein the at least one source may be a controlled source including a man-made source located at at least one fixed position with respect to the at least one data acquisition system deployed as a fixed array or on a moving platform.

7. The method of claim 1, wherein the at least one source may be a controlled source including a man-made source located on at least one moving platform that moves with respect to the at least one data acquisition system deployed as a fixed array or on a moving platform.

8. The method of claim 1, wherein the at least one source may be is a natural source.

9. The method of claim 1, wherein the inversion/migration imaging of the geophysical data includes an algorithm based on a numerical solution of field equations in either the frequency domain and/or the time domain and/or the spatial domain and/or the wave number domain including but not limited to semi-analytical, finite difference, finite element, boundary element, integral equation and/or hybrid numerical methods.

10. The method of claim 1, wherein volume imaging is based on the inversion and/or migration imaging comprised of:
a) an algorithm based on an iterative linearized method and/or line search and/or preconditioning technique;
b) Fréchet derivatives and/or their actions calculated implicitly and/or explicitly using adjoint operators;
c) temporal sensitivities and/or their actions calculated implicitly and/or explicitly using linear approximations;
d) an algorithm based on regularization including smooth and/or focusing stabilizers and/or combinations thereof; and
e) an algorithm based on an integrated sensitivity domain of the at least one source and sensor sensitivities.

11. The method of claim 1, wherein at least one data acquisition system is deployed on one of a vessel, a wireline device, a bottom hole assembly, an unattended aerial vehicle (UAV), a helicopter, fixed wing aircraft, an airship, or a vehicle.

12. The method of claim 1, wherein the examined medium contains a geological structure.

13. A physical non-transitory computer readable medium having stored thereon computer executable instructions that when executed by a processor cause a computing system to perform a method for volume imaging of physical properties of an examined medium from at least one data acquisition system deployed as a fixed array and/or from at least one moving platform using at least one source and placed in at least one position on the at least one data acquisition system and one or more sensors, the method comprising:
a. measuring at least one component of geophysical field data with the one or more sensors located in one or more receiving positions along one or more survey lines performed by the at least one data acquisition system;
b. selecting one or more subsets of a geophysical survey comprising the one or more survey lines performed by the data acquisition system, the selected one or more subsets being based on a pairing of the at least one source and the one or more sensors located in the one or more receiving positions;
c. determining integrated sensitivity subdomains for the pairing of the at least one source and the one or more sensors of the selected one or more subsets of the geophysical survey by calculating one or more volumes where an integrated sensitivity of the selected one or more subsets is greater than a given threshold, wherein those volumes where the integrated sensitivity of the selected one or more subsets is greater than the given threshold are included in the sensitivity subdomains;
d. calculating a sensitivity of geophysical data collected by the selected subsets of the geophysical survey corresponding to the integrated sensitivity subdomains;
e. calculating a total sensitivity for the entire geophysical survey as the superposition of the sensitivities calculated for all of the integrated sensitivity subdomains;
f. constructing a 3D volume image of the corresponding physical property of the examined medium by applying inversion/migration imaging to the geophysical data measured by the at least one data acquisition system using the total sensitivity calculated as the superposition of the sensitivities from all of the integrated sensitivity subdomains; and
g. selecting one or more geographical formations and/or man-made objects for further exploration based on the constructed 3D volume image, the selection specifying which portion of the examined medium that the selected one or more geographical formations and/or man-made are located.

14. A system for volume imaging of physical properties from data acquisition systems deployed as a fixed array and/or from at least one moving platform comprising:

a data acquisition system deployed as a fixed array and/or from at least one moving platform:

at least one source and one or more sensors that are part of the data acquisition system configured to generate and measure at least one component of geophysical field data; and a computing system comprising:
  a processor;
  one or more physical non-transitory computer readable medium having computer executable instructions stored thereon that when executed by the processor, cause the computing system to perform the following:

a. measure at least one component of the geophysical field data with the one or more sensors located in one or more receiving positions along one or more survey lines performed by the at least one data acquisition system;

b. selecting one or more subsets of a geophysical survey comprising the one or more survey lines performed by the data acquisition system, the selected one or more subsets being based on a pairing of the at least one source and the one or more sensors located in the one or more receiving positions;

c. determining integrated sensitivity subdomains for the pairing of the at least one source and the one or more sensors of the selected one or more subsets of the geophysical survey by calculating one or more volumes where an integrated sensitivity of the selected one or more subsets is greater than a given threshold, wherein those volumes where the integrated sensitivity of the selected one or more subsets is greater than the given threshold are included in the sensitivity subdomains;

d. calculate a sensitivity of geophysical data collected by the selected subsets of the geophysical survey corresponding to the integrated sensitivity subdomains;

e. calculate a total sensitivity for the entire geophysical survey as the superposition of the sensitivities calculated for all of the integrated sensitivity subdomains;

f. construct a 3D volume image of the corresponding physical property of the examined medium by applying inversion/migration imaging to the geophysical data measured by the at least one data acquisition system using the total sensitivity calculated as the superposition of the sensitivities from all of the integrated sensitivity subdomains; and g. select one or more geographical formations and/or man-made objects for further exploration based on the constructed 3D volume image, the selection specifying which portion of the examined medium that the selected one or more geographical formations and/or man-made are located.

15. The system of claim 14, wherein the at least one source and/or the one or more sensors comprises a plurality of field sensors arranged in an array.

16. The system of claim 14, wherein the at least one source and/or the one or more sensors includes one or more of the following: inductive sensors, galvanic sensors, capacitive sensors, gravimeters, gravity gradiometers, magnetometers, magnetic gradiometers, and seismometers.

17. The system of claim 14, wherein the at least one source and/or the one or more sensors may be controlled sources including man-made sources located at at least one fixed position with respect to the at least one data acquisition system deployed as a fixed array or on a moving platform.

18. The system of claim 14, wherein the at least one source and/or the one or more sensors may be controlled sources including man-made sources located on at least one moving platform that moves with respect to the at least one data acquisition system deployed as a fixed array or on a moving platform.

19. The system of claim 14, wherein the data acquisition system is deployed on one of a vessel, a wireline device, a bottom hole assembly, an unattended aerial vehicle (UAV), a helicopter, fixed wing aircraft, an airship, or a vehicle.

* * * * *